United States Patent [19]

Suzuki et al.

[11] Patent Number: 4,639,867
[45] Date of Patent: Jan. 27, 1987

[54] DIGITAL FLUOROSCOPY APPARATUS

[75] Inventors: Motomu Suzuki, Ootawara; Hiroshi Asahina, Tochigi, both of Japan

[73] Assignee: Kabushiki Kaisha Toshiba, Kawasaki, Japan

[21] Appl. No.: 652,656

[22] Filed: Sep. 20, 1984

[30] Foreign Application Priority Data

Sep. 21, 1983 [JP] Japan ................................ 58-173117

[51] Int. Cl.[4] ......................... G06F 15/42; G06G 7/60
[52] U.S. Cl. ...................................... 364/414; 378/99; 358/111; 128/654
[58] Field of Search ........................... 378/99; 358/111; 128/654, 653; 364/414

[56] References Cited

U.S. PATENT DOCUMENTS

4,204,225  5/1980  Mistretta ............................ 378/99
4,204,226  5/1980  Mistretta et al. .................... 378/99
4,375,068  2/1983  McBride ............................. 378/99

Primary Examiner—E. A. Goldberg
Assistant Examiner—Lincoln D. Donovan
Attorney, Agent, or Firm—Finnegan, Henderson, Farabow, Garrett & Dunner

[57] ABSTRACT

In a digital fluoroscopy apparatus, digital reference data is written in a given data position of digital image data where no medical information is contained. This digital reference data has contrast level information with respect to X-ray images of an object under examination. The image data having the reference data is stored in an analogue storage device after being D/A-converted. When the image signal having the D/A-converted reference data is again A/D-converted for the digital subtraction, the contrast level of the finally-A/D-converted reference data varies from that of the original reference data. The image data having the finally-A/D-converted reference data is corrected based upon the contrast level variation from the original level in an image data correction unit.

8 Claims, 12 Drawing Figures

DIGITAL FLUOROSCOPY APPARATUS

BACKGROUND OF THE INVENTION

1. Field of the Invention

This invention relates to a digital fluoroscopy apparatus. In particular, the invention is an improvement in automatically correcting contrast levels of image data.

2. Description of Prior Art

In a digital fluoroscopy apparatus, a digital subtraction is usually carried out. In this technique, a fluoroscopic X-ray image of an anatomical region, such as the heart is made and converted to corresponding digital picture element (pixel) values. Shortly after one image is made, an X-ray contrast medium that has been injected into the blood vessels reaches the heart blood vessels, and then another X-ray image is made and converted to digital pixel values. When one of the images is subtracted from the other, digital difference pixel signals result. The difference signals are amplified and converted to analogue video signals which are fed to a television monitor that displays the difference image. In the difference image, some anatomical structures are deemphasized and a higher contrast and more easily visualized image of the mediuminfused vessels remains.

Methods and apparatus for performing a digital X-ray image subtraction are described in U.S. Pat. Nos. 4,204,225 and 4,204,226.

In a digital fluoroscopy apparatus, an important aspect for the image quality is to process a plurality of image signals while maintaining original contrast levels. That is, a precise diagnosis can be realized by processing the successive image signals to obtain the difference signals while keeping their precise contrast.

In the digital fluoroscopy apparatus, an analogue storage device, such as a video tape recorder (VTR) or a video disc recorder (VDR) is employed to store the analogue image signals which have been processed for an image diagnosis. When the analogue data signals that have been stored in the analogue storage device are read out and fed to the image processor after being analogue-to-digital converted, a variation occurs in the entire signal level (contrast level), or the peak values of the A/D-converted image data signals. This causes the following problem. For instance, firstly the mask image signal that has been acquired before the X-ray contrast medium reaches the interest region is stored in the VDR.

Secondly, the contrast image signal that has been acquired after the medium reaches it is stored in the video disc recorder. Then, the digital subtraction is performed between the mask image signal and the contrast image signal. A correct subtraction result may not be obtained because, as previously described, the signal levels of both the image signals vary from their original levels. These level variations are mainly caused by inherent characteristics of the amplifiers, coating fluctuations of the recording materials and reproducing characteristics of the magnetic head with respect to the analogue storage device, and conversion characteristics of the A/D and D/A converters.

Another prior art approach is to employ a digital magnetic disc memory instead of the analogue storage device, which is capable of storing directly the digital image signals that have been processed in the image processor. However, the total cost of such a digital magnetic disc memory is extremely more expensive than that of the analogue storage device.

An object of the present invention is to provide a digital fluoroscopy apparatus which automatically compensates for the level variations before the image data signals are processed.

SUMMARY OF THE INVENTION

The object of the invention may be accomplished by providing a digital fluoroscopy apparatus wherein a plurality of X-ray images of an object under examination are sequentially produced and are then converted into a plurality of first analogue image signals comprising, an A/D converter for A/D-converting one of the first analogue image signals into first digital image data, a reference data generator for generating reference data in a digital form having contrast level information with respect to the X-ray images, an address data generator for generating address data in a digital form, a write unit for writing, based upon the address data, the reference data into a given data position of the first image data where no medical information is contained, a digital memory for digitally storing the first image data into which the reference data has been written, a D/A converter for D/A-converting the first image data derived from the digital storage means into a second analogue image signal having D/A-converted reference data, an analogue storage device for storing the second analogue image signal having the D/A-converted reference data, a reference data detection unit for detecting reference data of second image data derived from the analogue storage device, which has been A/D-converted by the A/D converter so as to obtain level variations of A/D-converted reference data written into the second image data from the reference data generated by the reference data generator, and a reference data correction unit for correcting contrast levels of the second image data detected by the reference data detection unit based upon the detected level variations.

BRIEF DESCRIPTION OF THE DRAWINGS

The object and features of the invention will become apparent with reference to the following specification and to the drawings in which.

DETAILED DESCRIPTION OF THE PREFERRED EMBODIMENTS

Figure 1:
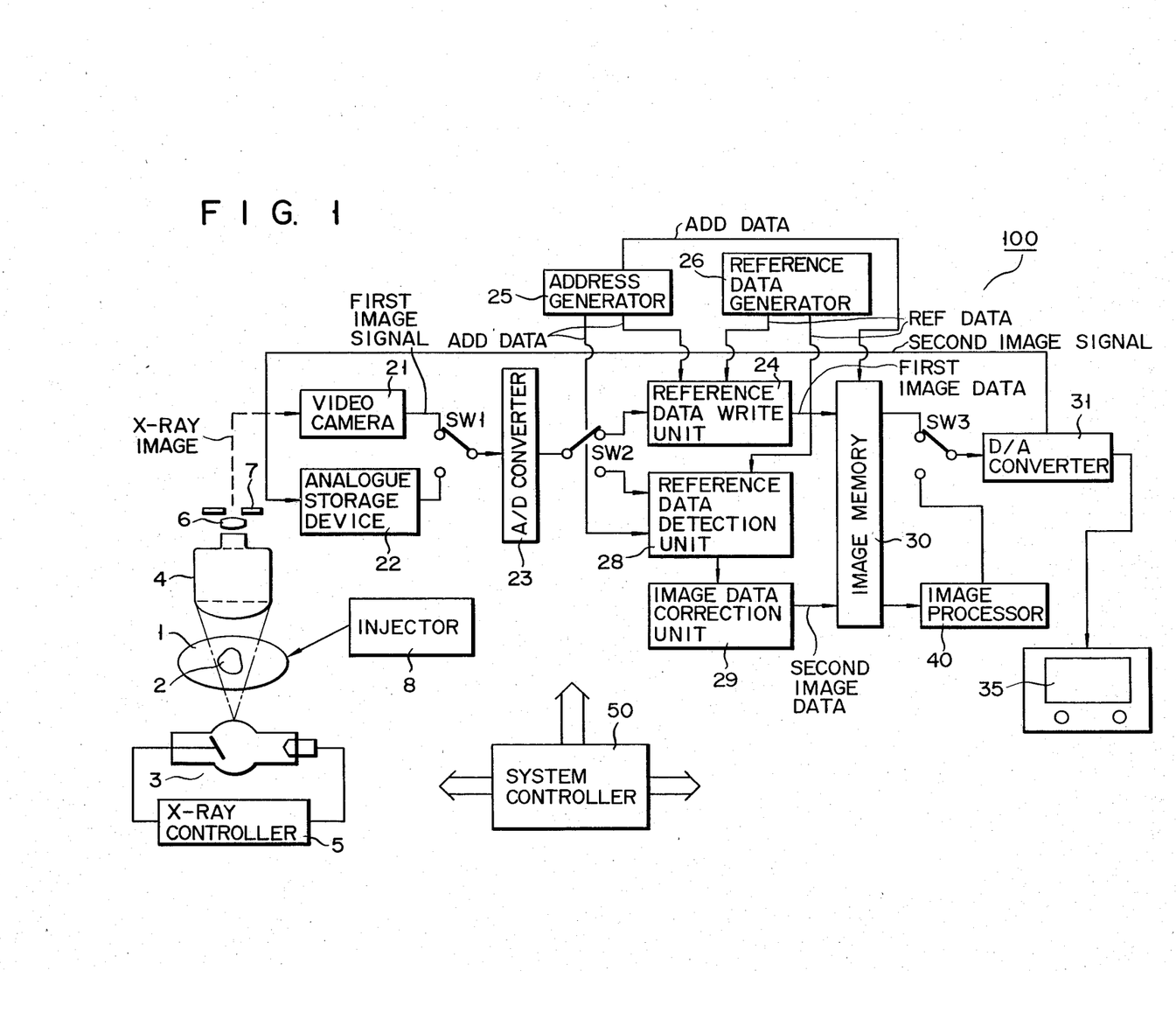
FIG. 1 is a block diagram of a digital fluoroscopy apparatus according to a preferred embodiment of the invention.

In FIG. 1, a digital fluoroscopy apparatus 100 is shown in which a fundamental structure is disclosed.

In FIG. 1 an object under examination, such as a body is represented by the ellipse marked 1, and anatomy of particular interest, such as the heart is marked 2. During an examination, the body 1 is disposed over an X-ray tube 3. When the X-ray tube 3 is energized, its beam is projected through the body 1 to form a differentially attenuated X-ray image on an input screen of an X-ray image intensifier 4. The image intensifier 4 is conventional in that it is operated to convert an X-ray image to an electron image which is ultimately converted to a bright-minified optical image (visual image) on an output phosphor screen.

A power supply and exposure timings of the X-ray tube 3 are controlled by an X-ray controller 5 that is fully controlled by a system controller 50.

The optical image appearing on the output screen of the image intensifier 4 is optically coupled to a video camera 21 through optical elements, such as a lens 6 and an auto iris 7. An injector 8 is provided to inject the X-ray contrast medium into the object 1.

As a production of the X-ray image is known in the art, no more detailed description is made in this specification.

Referring to FIG. 1, the video camera 21 is optically coupled to the output plane of the image intensifier 4. A video signal derived from the video camera 21 will be called "a first image signal" in the specification. An analogue storage device 22 is provided. This device 22 is a commercially available, i.e., a video tape recorder (VTR) or a video disc recorder (VDR). The video camera 21 and the analogue storage device 22 are selectively connected to an analogue-to-digital (A/D) converter 23 via a first switch SW1. The A/D converter 23 is selectively connected to either a reference data write unit 24 or a reference data detection unit 28. A reference data generator 26 produces reference data in a digital form that is supplied to the reference data write unit 24. An address generator 25 produces address data in a digital form that is also supplied to the reference data write unit 24. Similarly those reference data and address data are supplied to the reference data detection unit 28. An output of the reference data write unit 24 will be called "first image data". In image data correction unit 29 is connected to the reference data detection unit 28. An output of the image data correction unit 29 will be called "second image data". Both the first and second image data are supplied to an image memory 30 so as to be temporarily stored therein.

The image memory 30 is connected via a third switch SW3 to a digital-to-analogue (D/A) converter 31. This image memory 30 is also connected via an image processor 40 and the third switch SW3 to the D/A converter 31. An output of the D/A converter 31 will be called "a second image signal". The second image signal is supplied to either a display device 35 or the above-described analogue storage device 22.

A brief description will be made of the reference data write operation. The reference data generated from the reference data generator 26 contains, for example, 8 bits that are used to represent the contrast level of the input image data as standard contrast data. This bit number is determined based upon the contrast level of the input image data. This reference data is written in a given position of the input image data that is derived from the video camera 21 through the A/D converter 23. This given position is determined by the following basis.

Figure 2:
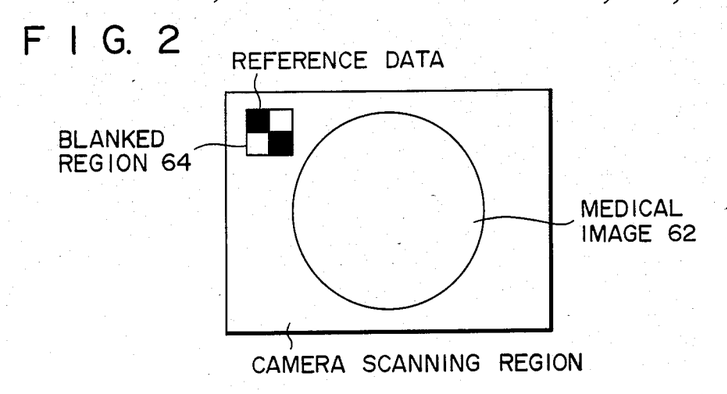
FIG. 2 illustrates a circle-blanked image and a reference data image.
Figure 3A:
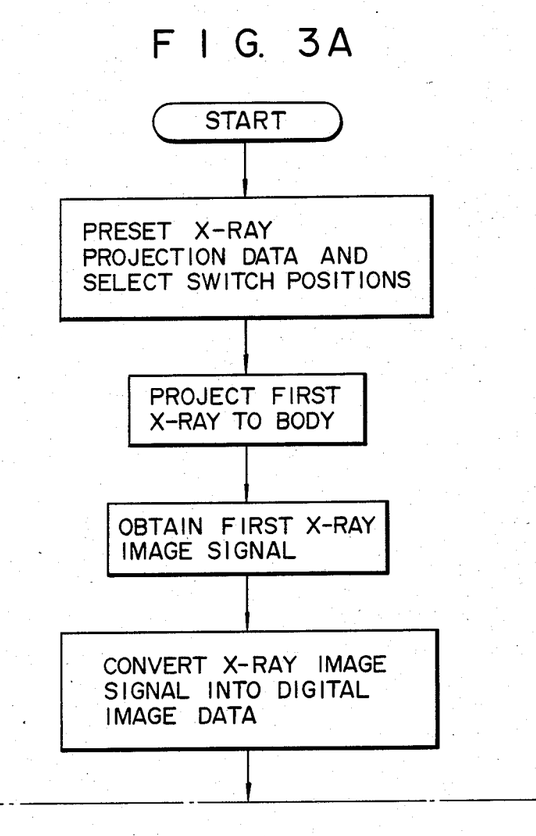
FIG. 3 is a flow chart for executing a digital subtraction in the apparatus shown in FIG. 1.
Figure 3B:
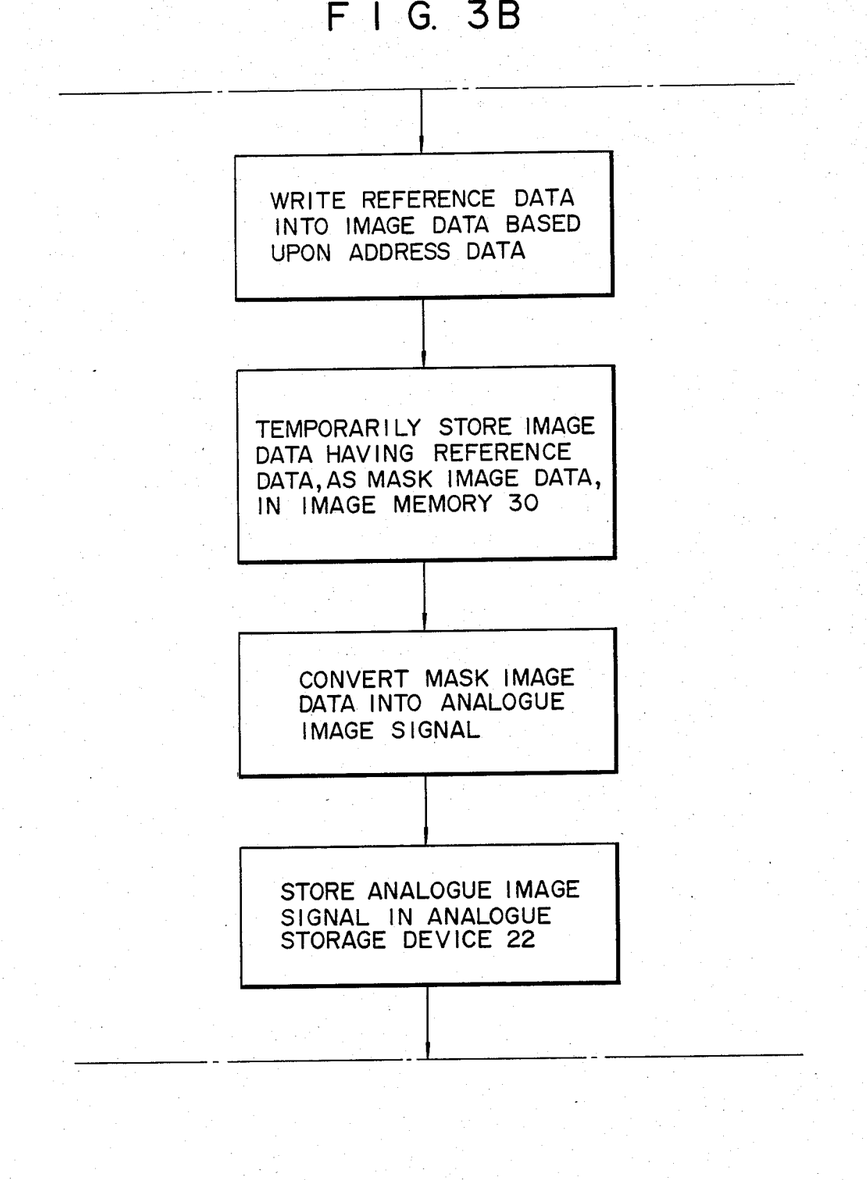
Figure 3C:
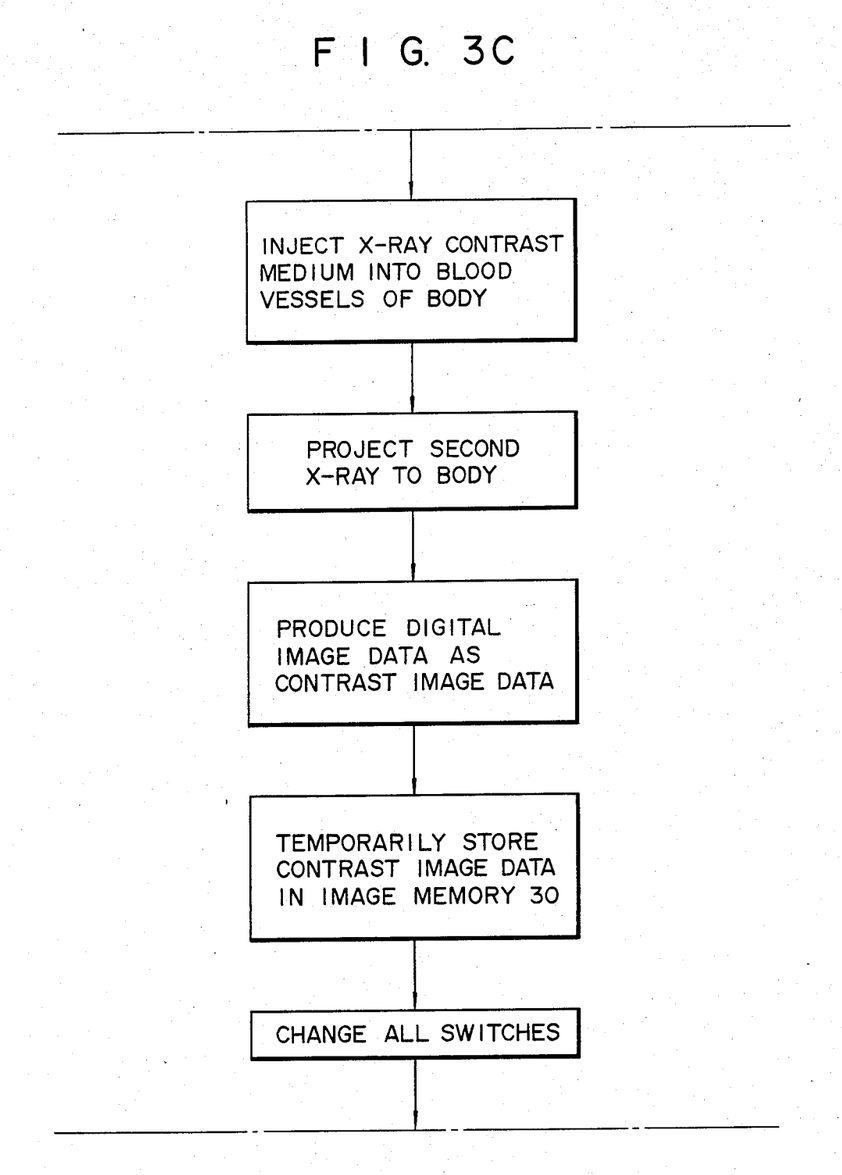
Figure 3D:
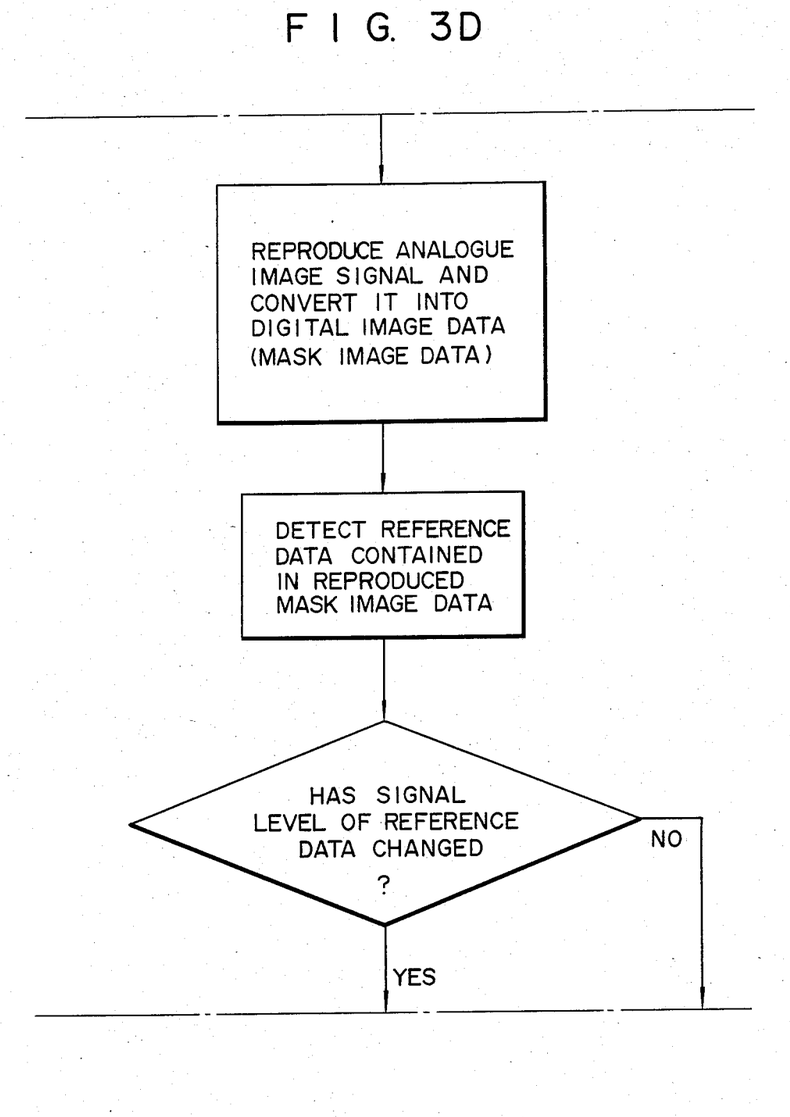
Figure 3E:
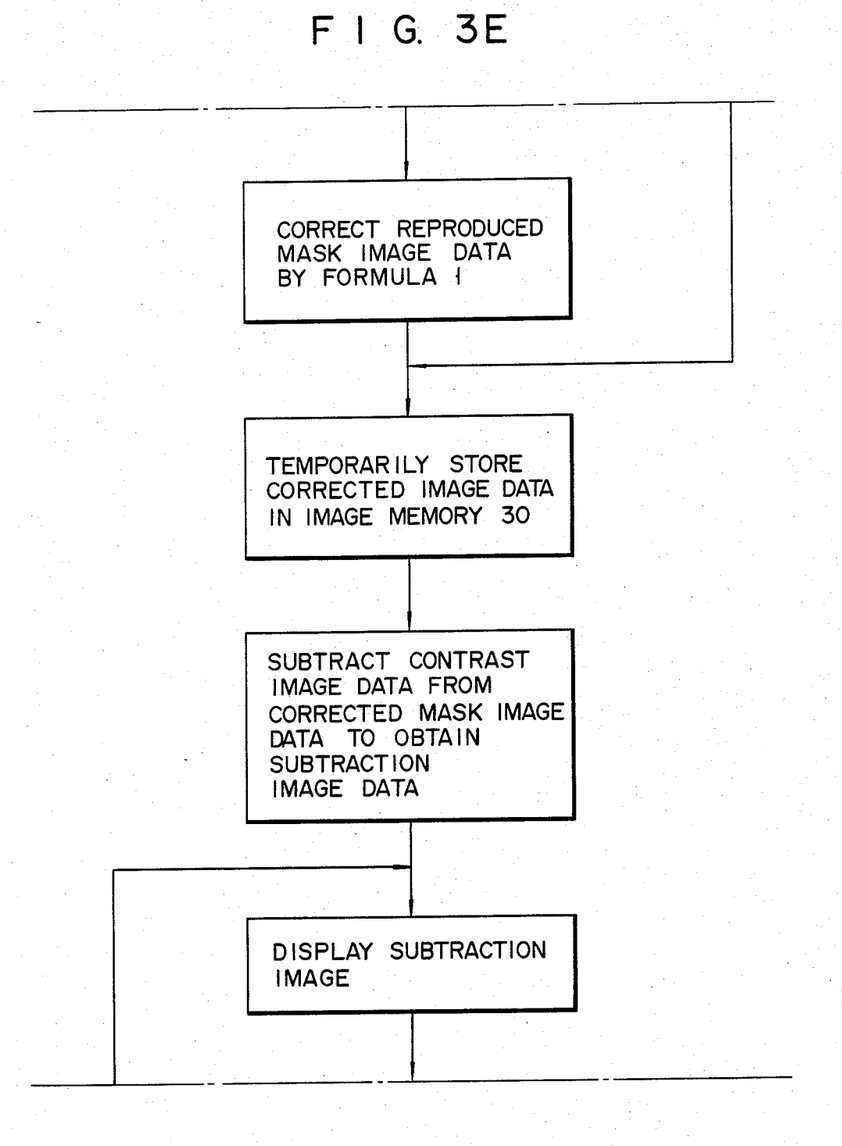
Figure 3F:
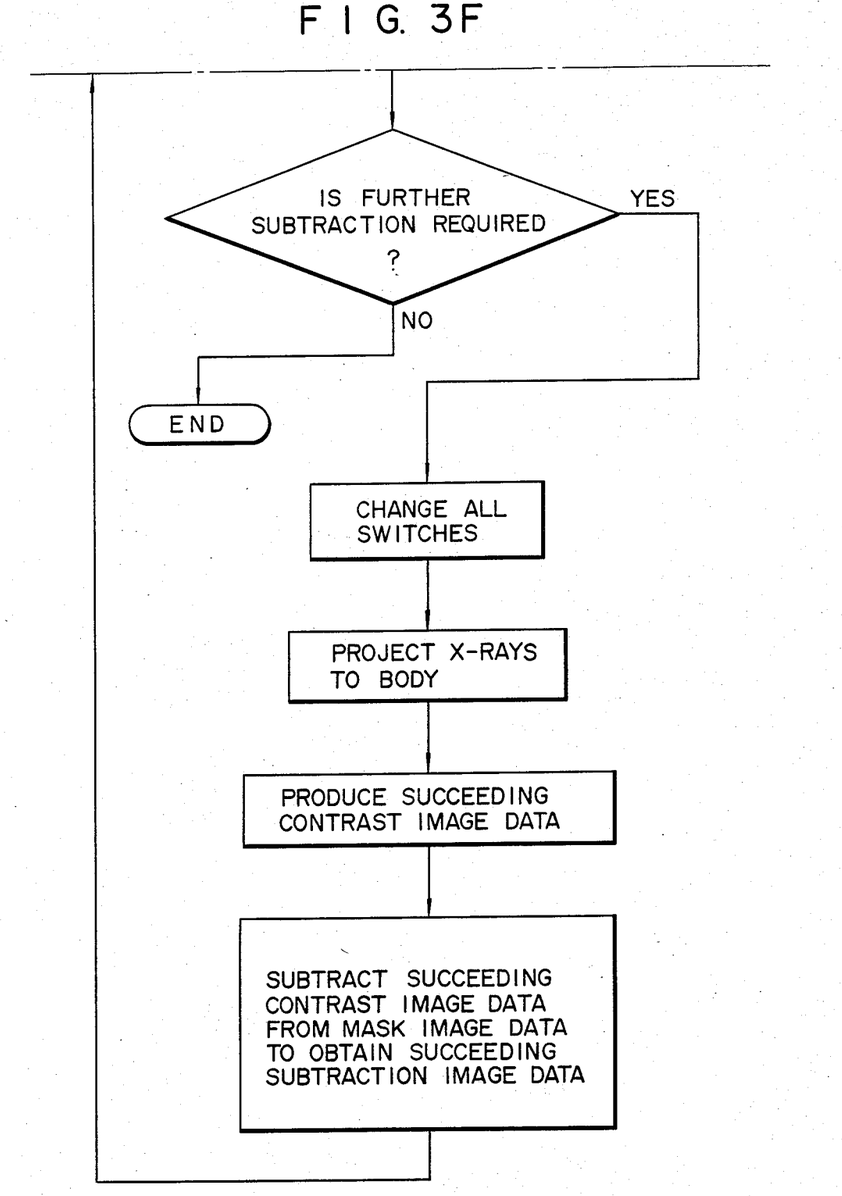

A shape of the output phoshor screen of the X-ray image intensifier 4 is circular. In contrast, a shape of a scanning region of the video camera 21 is rectangular (see FIG. 2). Accordingly, a signal having no medical image information is contained in the entire image signal derived from the video camera 21. It is, therefore, preferable to write the reference data into the no medical information signal portion of the image data.

The image processing method of the image processor 40 will be briefly explained. A series of the image data stored in the image memory 30 is processed by way of a digital subtraction, a contour suction, or an image enhancement.

A system controller 50 performs a series of the above-mentioned control operations, i.e., the X-ray generation, the X-ray image-to-video signal conversion, the reference data write/correction, and the image processing.

A description will now be made of the operation of the digital fluoroscopy apparatus 100.

The X-ray controller 5 controls the X-ray generation in response to the operation program of the system controller 50. The X-rays are generated at a given time from the X-ray tube 3. As a result, the video signals, i.e., the first image signals are derived from the video camera 21 in a real-time mode every one frame. This image signal is exclusively supplied to the reference data write unit 24 after being A/D-converted in the A/D converter 23. When the reference data write unit 24 receives the A/D-converted first image signal in combination with the reference data and the address data, the image data is addressed based upon the address data of the address data generator. Simultaneously, the reference data having a predetermined contrast level is written into the pixels of the no medical image region. That is, the reference data is written in the blanked region 64 of the camera scanning region. This blanked region 64 exists in the entire scanning region excluded by the circle-blanked medical image 62 (see FIG. 2). The image data into which the reference data has been written in the reference data write unit 24 is supplied to the image memory 30. This image data is called "the first image data". When a plurality of the acquired first image data is image-processed in a real-time mode, e.g., the mask image processing, it is sequentially fed to the image processor 40. Thereafter, a series of the processed image data is D/A-converted by the D/A converter 31 and then displayed in the display device 35. It is, however, possible to directly supply the first image data to the D/A converter 31. In contrast, when the digital subtraction image data that is not image-processed in a real-time mode is required, the first image data is fed via the third switch SW3 to the D/A converter 31 in which it is converted to the second image signal.

The second image signal into which the reference data has been written in the given pixel positions, i.e., the blanked region 64 is then recorded to the analogue storage device 22. As previously described, bias and peak values of the video signal (a contrast level) derived from the analogue storage device 22 are shifted from those of the original image signal, i.e., the first image signal of the video camera 21, due to the above-mentioned cause. The video signal whose contrast levels have been shifted is again A/D-converted and then supplied to the reference data detection unit 28 by changing over the first and second switches SW1 and SW2 in positions opposite to those shown in FIG. 1. In the reference data detection unit 28, the image data output from the analogue storage device 22 is addressed based upon the address data of the address data generator 25, and simultaneously, the given addresses used to write the reference data are detected, or discriminated from the detected addresses.

A discrimination of the reference data detection unit 28 will now be explained. As previously described, the reference data derived from the reference data generator 26 is constructed by 8 bits. The original black, or low contrast level of this reference data is indicated by "0" in a digital value, and the original grey, or medium contrast level thereof is denoted by "127" in the digital value. The reference data having such an 8-bit digital value is written at first into the original image data (i.e., the first image signal of the video camera 21 in a digital form). Since the original image data has not yet been recorded in the analogue storage device 22, both the signal (contrast) levels of the first image data and the written reference data are not shifted.

When the first image data having the reference data is fed to the reference data detection unit 28 after being processed in the D/A converter 31 and the A/D converter 23, the following discrimination is carried out. That is, for instance, if the black level of the detected reference data is shifted to "0+L", and the grey level thereof is shifted to "127+H", the image data is required to be corrected in accordance with the following equation (1):

$$Di = (di - L) \times \left( \frac{H-L}{128} + 1 \right), \quad (1)$$

where "di" indicates the discriminated second image data, "Di" indicates the corrected second image data, "L" denotes a variation with respect to the original black level of the reference data, and "H" denotes a variation with respect to the original grey level thereof.

It is understood that the bit numbers, e.g., 8 bits of the reference data can be determined based upon the contrast level of the image signal so as to sufficiently cover the variations in the contrast levels of the image signal to be further processed.

As a result, the signal levels of the entire image data which has been corrected in the image data correction unit 29 are identical to that of the original image data. In other words, the variations of the signal levels, i.e., the peak values or the bias values can be compensated by the reference data detection unit 28 and the image data correction unit 29 based upon the discriminated reference data.

The corrected image data derived from the image data correction unit 29 is temporarily stored in the image memory 30. After changing over the first and second switches SW1 and SW2 in the original positions as shown in FIG. 1 and injecting the X-ray contrast medium by the injector 8, the X-ray projection is again performed. As a result, another first image signal is derived from the video camera 21. This first image signal is fed to the image processor 40 without writing any reference data. In the image processor 40, the digital subtraction is done between the corrected image data as a mask image and the just-acquired image data as a contrast image. It is, of course, possible to carry out other image processings, if desired.

According to the preferred embodiment, even if the contrast levels, e.g., the bias values and the peak values of the image data derived from the analogue storage device 22 are shifted from those of the original image data (the first image signal), there is no problem in the image processing, because the shifted image data is corrected in the reference data correction unit 29 before the image processing. As a result, a highly precise image-processing can be realized in the image processor 40. Thus, the correctly-processed image data is displayed in the display device 35.

It should be noted that if the image data as the contrast image needs to be stored in the analogue storage device 22, the same reference data write operation should be effected before the image processing.

A description will now be made of a digital subtraction that is performed in the digital fluoroscopy apparatus 100 shown in FIG. 1. An entire systematic operation of the apparatus is described in a flow chart shown in FIG. 3.

First, the X-ray projection data and the switches SW1, SW2 and SW3 are preset for the digital subtraction. Positions of those switches are changed to those as illustrated in FIG. 1. A first X-ray projection is carried out, so that a first X-ray image as a mask image is produced from the image intensifier 4. This X-ray image is converted by the video camera 21 to a first image signal (a first video signal, or a first mask image signal). The first image signal is fed to the reference data write unit 24 after being A/D-converted to the digital image data.

The reference data is written into the pixels of the blanked region 64 in accordance with the address data. The resultant image data having the reference data is temporarily stored in the image memory 30 as the mask image data. Subsequently, the mask image data is read from the image memory 30 so as to be D/A-converted into the second image signal. This second (analogue) image signal has the same medical information as in the first (analogue) image signal from the video camera 21, but has different contrast information from the first image signal, i.e., the reference data. The second image signal (the mask image signal having the reference data) is stored in the analogue storage device 22.

Then, the X-ray contrast medium is administered to the blood vessels of the body 1 from the injector 8 at a given time. After a predetermined time interval has passed from this administeration, a second X-ray projection is carried out. By doing this second projection, another X-ray image signal is similarly produced. This image signal is called "the contrast image signal". The A/D-converted contrast image data is supplied directly to the frame memory 30 without writing the reference data, thereby being temporarily stored therein. It should be noted that if this contrast image data is required to be recorded in the analogue storage device 22, the reference data is similarly written by the reference data write unit 24.

Next, all of the switches SW1 to SW3 are changed in the positions opposite to the illustrated ones. Then the mask image signal previously recorded in the analogue storage device 22 is reproduced, A/D-converted, and finally transferred to the reference data detection unit 28. In the detection unit 28, a variation in the signal level of the reproduced reference data of the mask image data can be detected with respect to that of the original reference data derived from the reference data generator 26. If the level variation exists, the entire contrast level of the mask image data is corrected based upon the above formula 1. Then the corrected mask image data is temporarily stored in the image memory 30.

In the image processor 40 the digital subtraction is performed between the just-acquired contrast image data and the corrected mask image data previously stored in the image memory 30. As a result, the subtraction image data is fed via the third switch SW3 to the D/A converter 31 by which it is converted to a corresponding subtraction image signal. The subtraction image signal is supplied to the display device 35, so that the subtraction image can be displayed for a medical diagnosis.

If the subsequent digital subtraction is required, the X-ray projection is repeated in conjunction with the medium administration. Thus a train of the contrast image data is obtained and temporarily stored in the image memory 30. Similarly, the digital subtraction is effected between the corrected mask image data and the successively-acquired contrast image data in the image processor 40. Accordingly, the succeeding subtraction images can be monitored by the display device 35.

Figure 4:
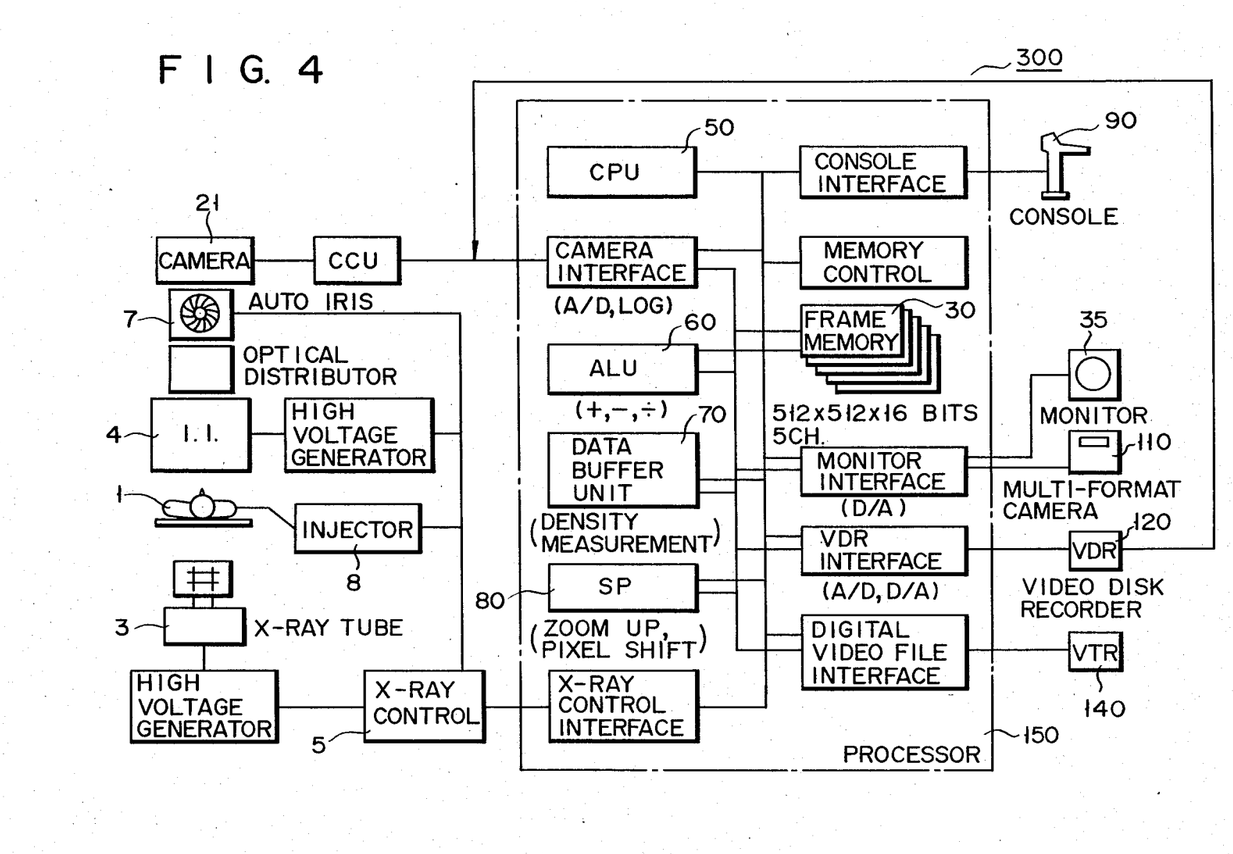
FIG. 4 is a block diagram of a practical circuit of the digital fluoroscopy apparatus according to a second preferred embodiment of the invention.

In FIG. 4, a practical circuit of the digital fluoroscopy apparatus 300 is shown in a block diagram. It should be noted that the same reference numerals shown in FIG. 1 will be employed as those for denoting the same circuit elements shown in the following Figures.

Since the construction of the X-ray projection system is known in the art, a detailed explanation thereof is omitted. A signal processor 150 is connected to the X-ray projection system to receive the analogue image signals. The signal processor 150 is basically constructed by a CPU as the system controller 50, a frame memory as the image memory 30, an ALU 60, a data buffer unit 70, a special processing unit 80 and relevant interface circuits. The signal system 150 is coupled to a console 90, the monitor 35, a multi-format camera 110, a video disc recorder 120 and a VTR 140. The console 90 may preset the X-ray projection data. The CPU 50 may process the predetermined program so as to execute the entire system of the apparatus 300. The data buffer unit 70 includes RAM's which can be directly accessible to the CPU 50. The above-mentioned data write and detection are carried out by the CPU 50 and the data buffer unit 70. The major function of the special processing unit 80 is the image data correction (will be described later). The video disc recorder 120 functions in the same way as the analogue storage device 22. The ALU 60 may perform the digital subtraction, summation and other arithmetic operations.

Figure 5:
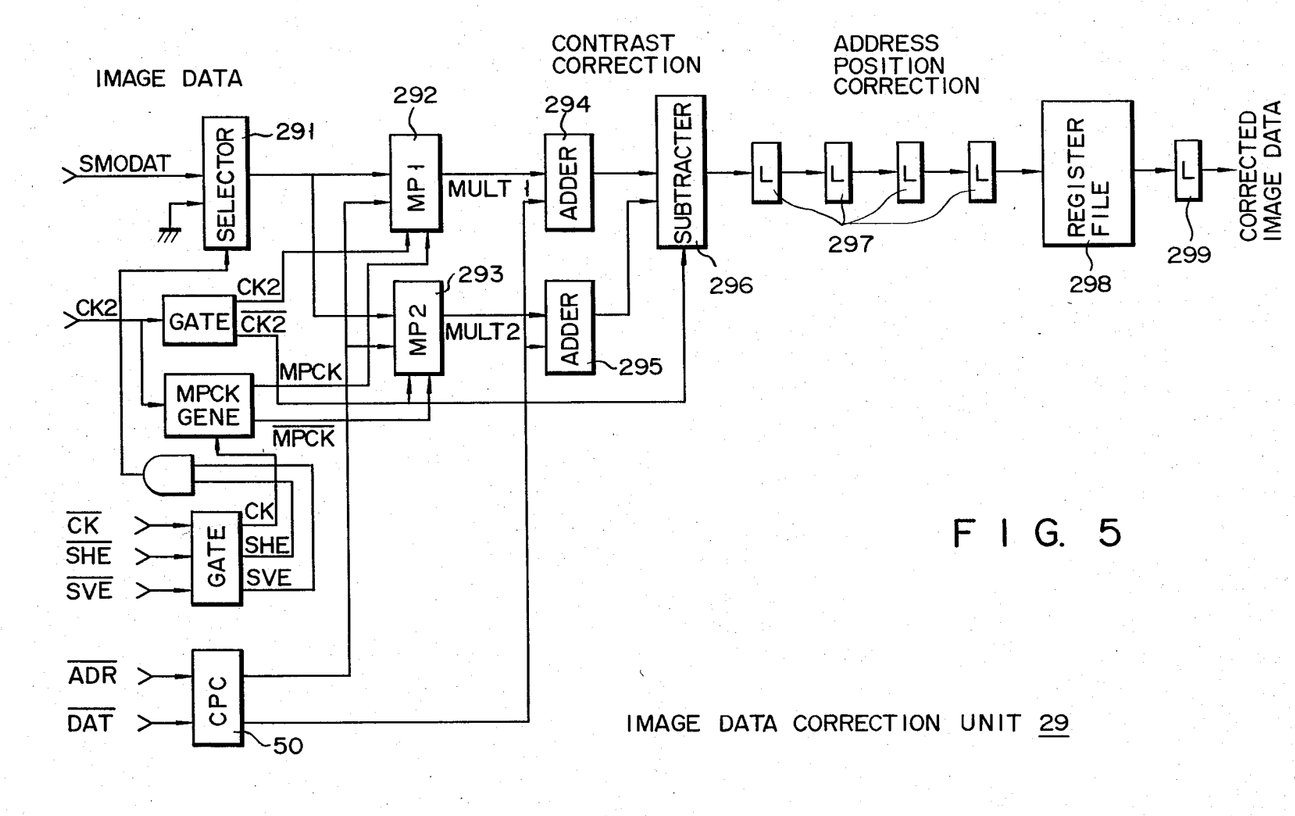
FIG. 5 is a block diagram of a practical circuit of the image data correction unit shown in FIG. 1.

In FIG. 5, a practical circuit of the image data correction unit 29 in combination with the CPU 50 is shown. The fundamental operation of this image data correction unit 29 is as follows. The image data detected by the reference data detection unit 24 is supplied to a selector 291. The selector 291 may select whether the image data is required for data corrections or not. If yes, then the image data is first processed by a contrast correction circuit. The contrast correction circuit is constructed by multipliers 292, 293, adders 294, 295 and a subtracter 296. As the contrast correction has been described in connection with the formula 1, no further explanation is made.

The image data which has been contrast-corrected is secondly corrected with respect to the address position correction. This correction is preformed by the address position correction circuit, which is constructed by a four-stage latch circuit 297, a register file 298, and one-stage latch circuit 299.

Figure 6A:
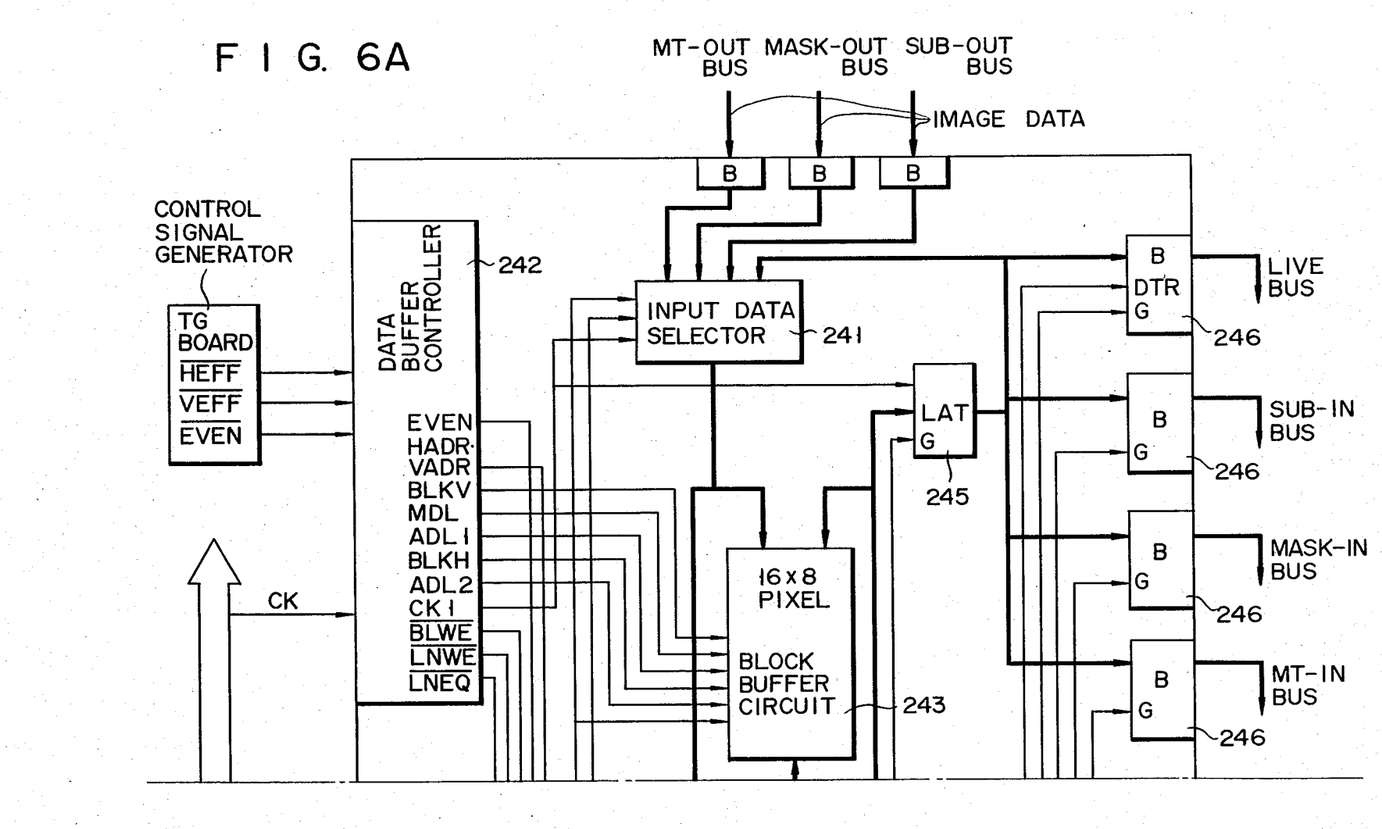
FIG. 6 is a block diagram of practical circuits of the reference data write and detection units shown in FIG. 1.
Figure 6B:
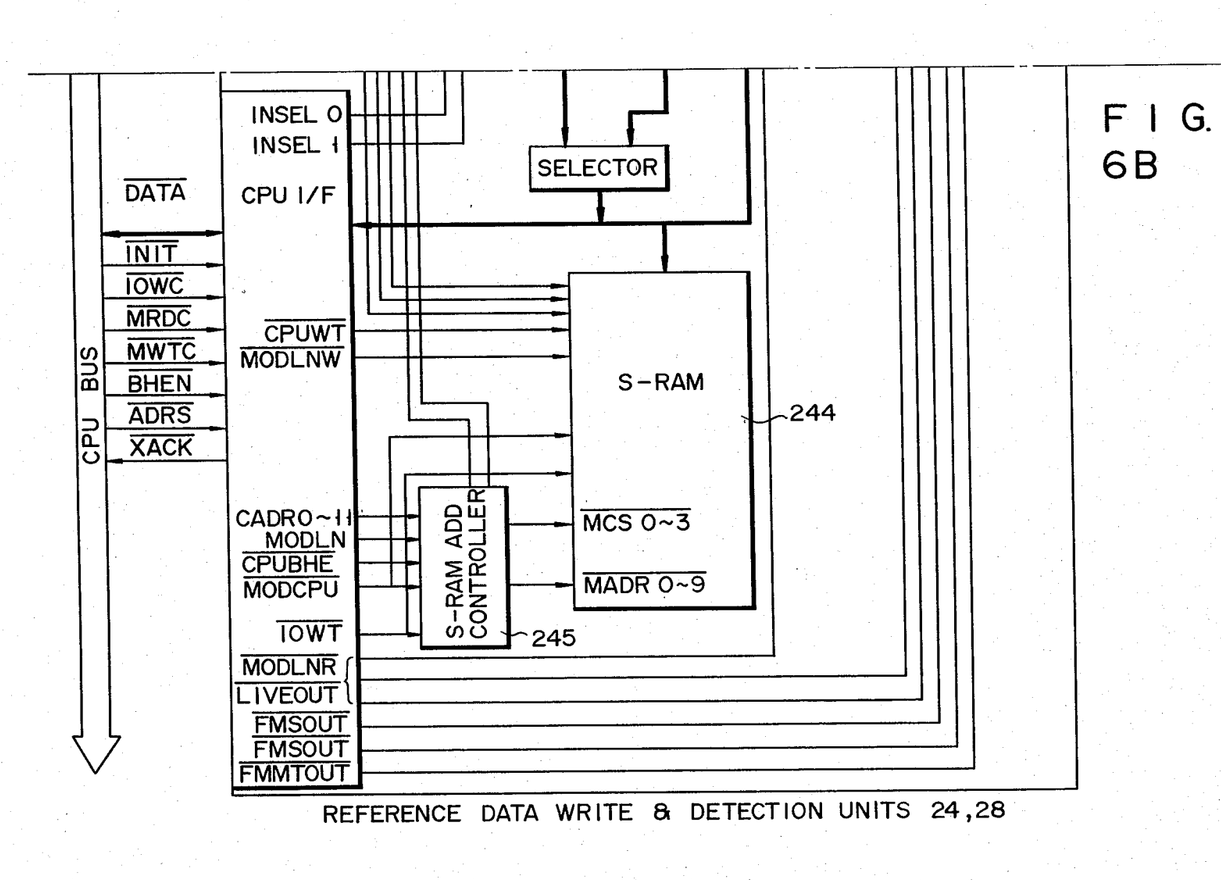

FIG. 6 shows a block diagram of a practical circuit of the reference data write unit 24 and detection unit 28. The second image data which is derived from either the video camera 21 (no reference data added) or the analogue storage device 22 (reference data added), is supplied to an input data selector 241 under the control of a data buffer controller 242. In accordance with the input image data, it is stored in a block buffer circuit 243 and is thereafter stored in an S-RAM 244 under the control of an S-RAM address controller 245. The S-RAM is an abbreviation for a static RAM. While the reference data is supplied to the block buffer circuit 243, the second image data (no reference data is added) is also supplied to the buffer circuit 243. Accordingly, the reference data write operation is carried out, and the resultant image data is once latched by a latch 245 and is then derived from the relevant output terminals 246.

When the second image data is derived from the analogue storage device 22 shown in FIG. 1, the level variations of the A/D-converted reference data written in the second image data are discriminated in the block buffer circuit 243 by comparing the original level of the reference data generated by the reference data generator 26. The variation results are fed to the image data correction unit 29 shown in FIG. 5. The second image data is similarly derived through the latch 245 from the output terminals 246.

As has been described above, in accordance with the invention, the contrast levels, e.g., the peak value or the bias value of the image data once stored in the analogue storage device can be corrected based upon the original contrast levels of the reference data. Since the image processing is performed after such a signal level correction, a highly-precise image processing can be achieved.

While the invention has been described in terms of certain preferred embodiments, and exemplified with respect thereto, those skilled in the art will readily appreciate that various modifications, changes, omissions, and substitutions may be made without departing the spirit of the invention. For instance, it is alternatively possible to employ another reference data in the reference data detection unit. Further, the image signal derived from the video camera 21 may be supplied to the reference data detection unit. If this image signal has no reference data, it is directly stored in the image memory 30.

What is claimed is:

1. A digital fluoroscopy apparatus wherein a plurality of X-ray images of an object under examination are sequentially produced and are then converted into a plurality of first analogue image signals comprising:

means for A/D-converting one of the first analogue image signals into first digital image data;

means for generating reference data in a digital form having contrast level information with respect to the X-ray images;

means for generating address data in a digital form;

means for writing, based upon the address data, the reference data into a given data position of the first image data where no medical information is contained;

means for digitally storing the first image data into which the reference data has been written;

means for D/A-converting the first image data derived from the digital storage means into a second analogue image signal having D/A-converted reference data;

analogue storage means for storing the second analogue image signal having the D/A-converted reference data;

means for detecting reference data of second image data derived from the analogue storage means, which has been A/D-converted by the A/D converter means so as to obtain level variations of the A/D-converted reference data written into the second image data from the reference data generated by the reference data generation means; and means for correcting contrast levels of the second image data detected by the reference data detection means based upon the detected level variations.

2. An apparatus as claimed in claim 1, wherein said reference data write means and said reference data detection means are constructed by at least an input data selector, a data buffer controller, a block buffer circuit, a static RAM a static RAM address controller, and a latch circuit.

3. An apparatus as claimed in claim 1, wherein said image data correction means is constructed by a contrast correction circuit and an address position correction circuit, said contrast correction circuit including a selector, first and second multipliers, first and second adders, and a subtracter, and said address position correction circuit including a four-stage latch circuit, a register file and one-stage latch circuit.

4. An apparatus as claimed in claim 1, further comprising:
an injector for injecting an X-ray contrast medium into the object under examination in conjunction with the X-ray image production;
an image processor for performing at least a digital subtraction to a plurality of the second image data which has been corrected by the reference data correction means; and
a display device for displaying at least a subtraction image by receiving digitally-subtracted second image data from the image processor via the D/A converter means.

5. An apparatus as claimed in claim 1, wherein the reference data generated by the reference data generation means is constructed by 8 bits, a black level of the reference data being indicated by "0" in a digital form and a grey level thereof being indicated by "127" in a digital form, and the image data correction is made by the image data correction means in the following equation:

$$Di = (di - L) \times \left( \frac{H - L}{128} + 1 \right),$$

where "Di" indicates the corrected second image data, "di" indicates the detected second image data, and "L" and "H" denote a variation with respect to the black and grey levels, respectively.

6. An apparatus as claimed in claim 1, wherein said plurality of X-ray images are produced by an X-ray tube, an image intensifier and a video camera under the control of an X-ray controller, which are optically-aligned along a given optical path.

7. An apparatus as claimed in claim 1, wherein the analogue storage means is a video tape recorder.

8. An apparatus as claimed in claim 1, wherein the analogue storage means is a video disc recorder.

* * * * *